United States Patent [19]
Tunesi

[11] 3,814,463
[45] June 4, 1974

[54] STABILIZING AND ANTI-ZIGZAG DEVICE FOR CARAVANS AND TRAILERS

[76] Inventor: Roger Tunesi, 12 Montee Beaumur, Vienne, France

[22] Filed: Dec. 20, 1972

[21] Appl. No.: 316,784

[30] Foreign Application Priority Data
Dec. 20, 1971 France .............................. 71.46668
Dec. 12, 1972 France .............................. 72.44948

[52] U.S. Cl. .......................... 280/406 A, 280/446 B
[51] Int. Cl. ............................................... B60d 1/16
[58] Field of Search ......... 280/406 R, 406 A, 446 B

[56] References Cited
UNITED STATES PATENTS

| | | | |
|---|---|---|---|
| 2,643,891 | 6/1953 | Mosley | 280/406 A |
| 2,793,878 | 5/1957 | Toland | 280/406 A |
| 3,403,928 | 10/1968 | Laughlin | 280/406 A |
| 3,600,004 | 8/1971 | Newkirk | 280/406 A |
| 3,633,939 | 1/1972 | Euernham | 280/406 A |

*Primary Examiner*—Leo Friaglia
*Assistant Examiner*—Randall A. Schrecengost
*Attorney, Agent, or Firm*—Sughrue, Rothwell, Mion, Zinn & Macpeak

[57] ABSTRACT

An anti-zigzag device for attaching caravans or road trailers to a vehicle is disclosed which includes at least one metallic connection piece, to the rear end of which the lower end of a jack is linked, the other end of said jack being removably coupled to the pole of the caravan, while a linking pin passes through the front portion of said connection piece and is provided with a lower locking nut to compress the stack constituted by the above-mentioned piece and a rotary friction damper. The projecting upper end of the pin is adapted to be removably fit into a coupling device integral with the rear of the hauling vehicle.

22 Claims, 25 Drawing Figures

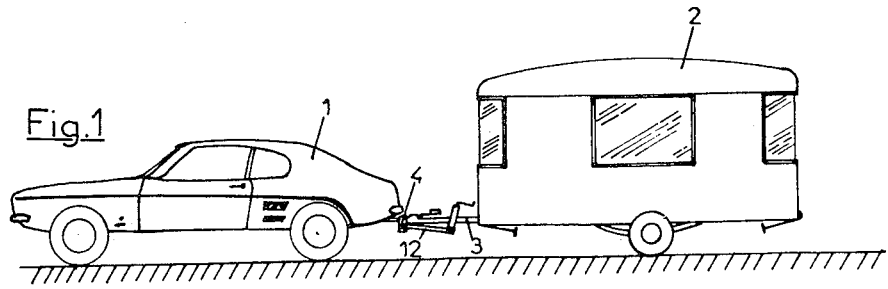
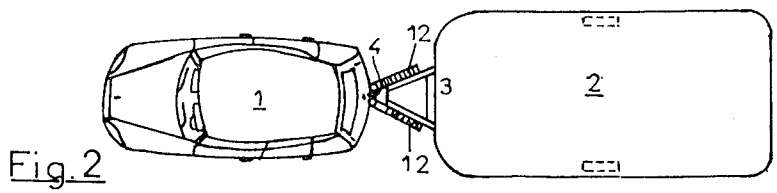
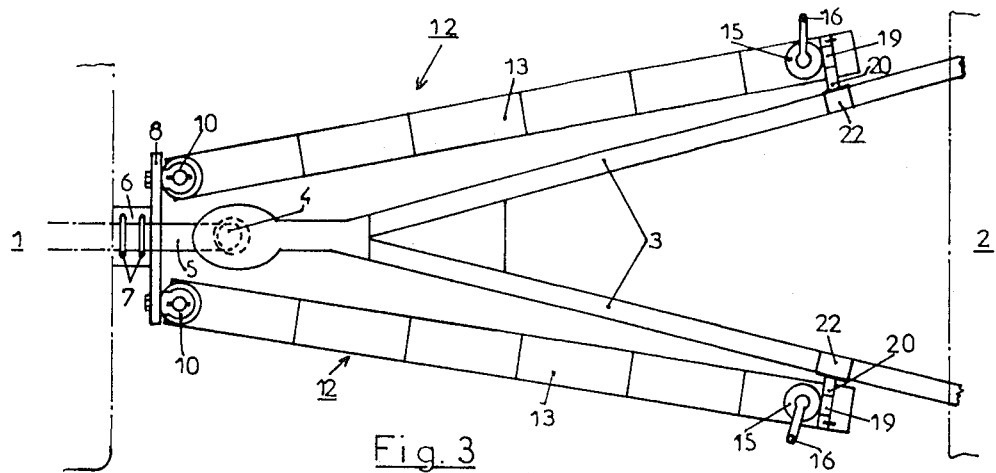
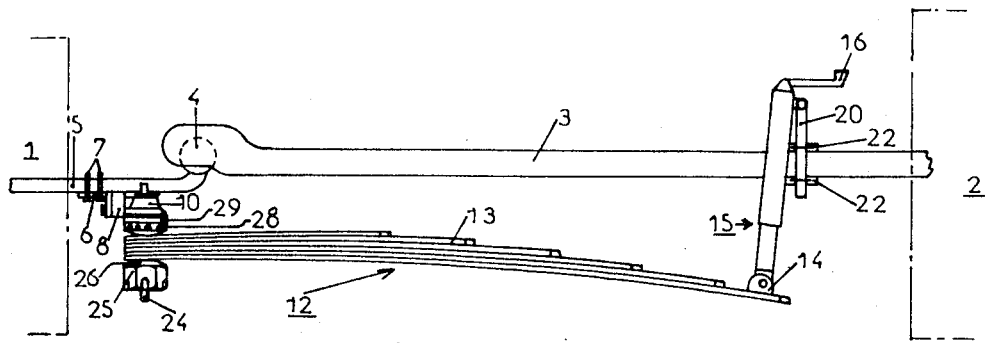

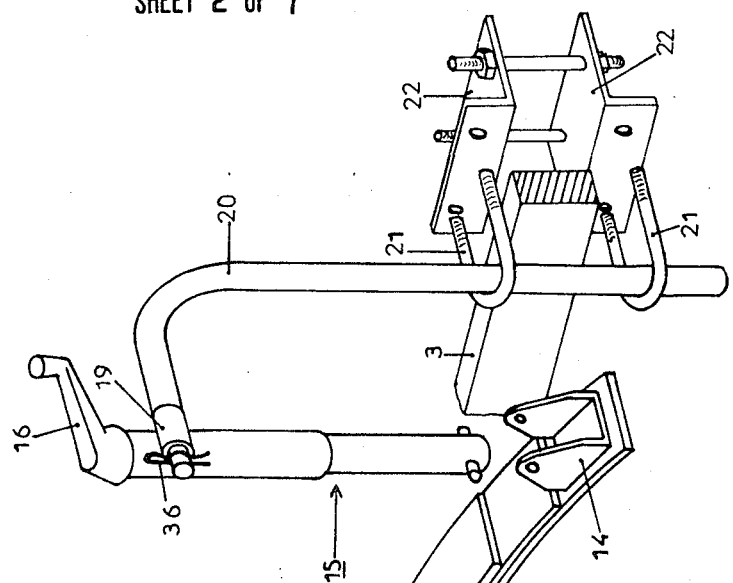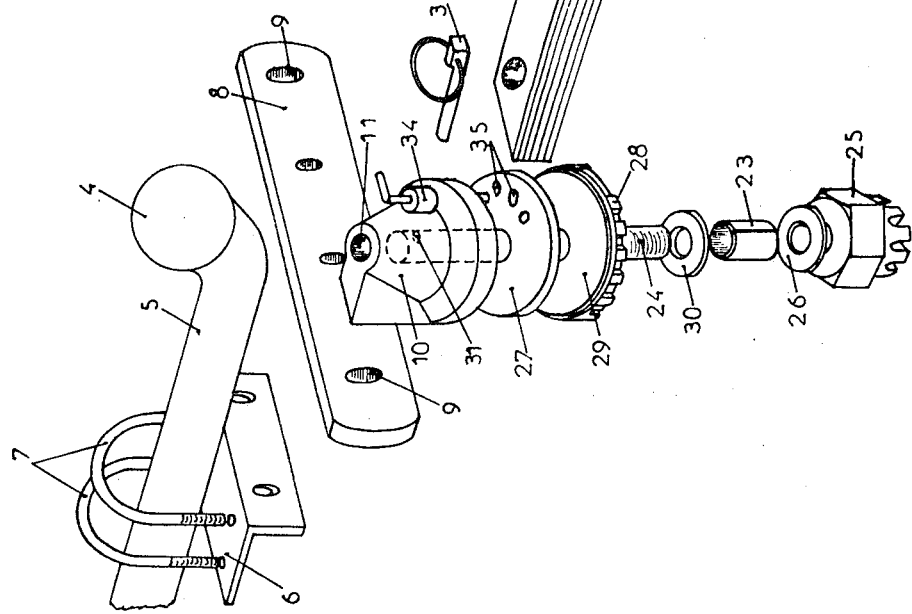
Fig.5

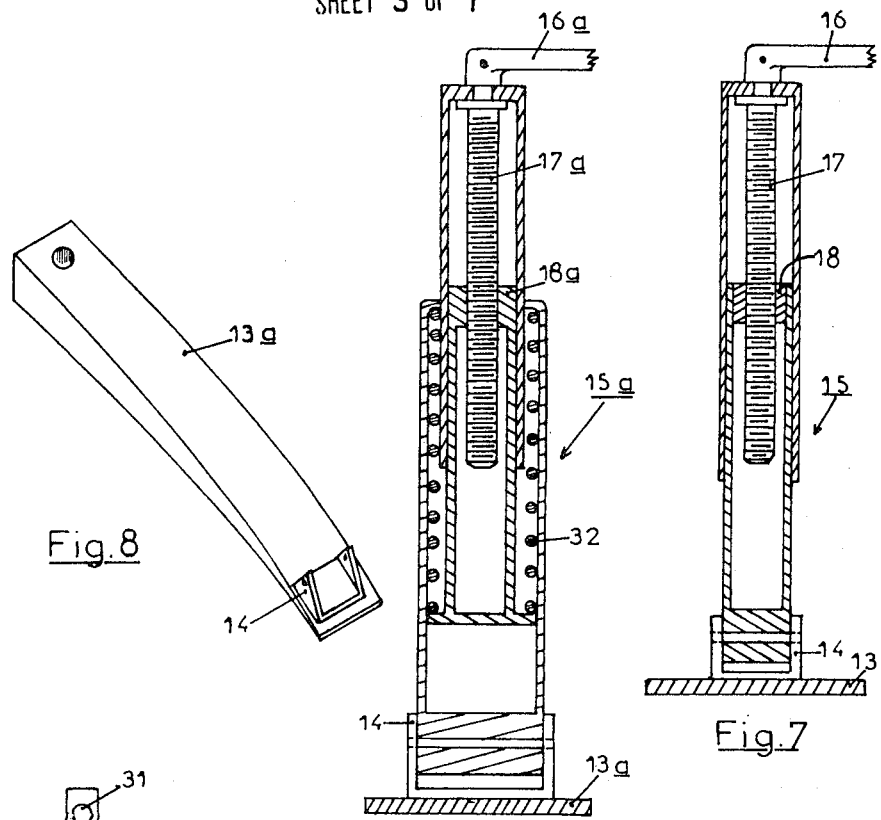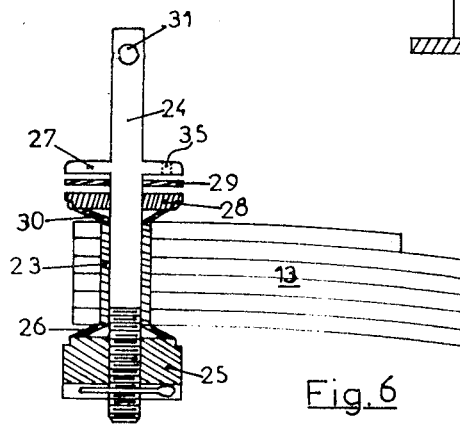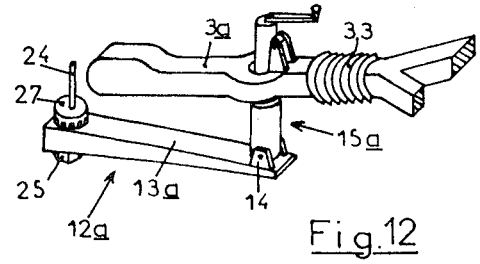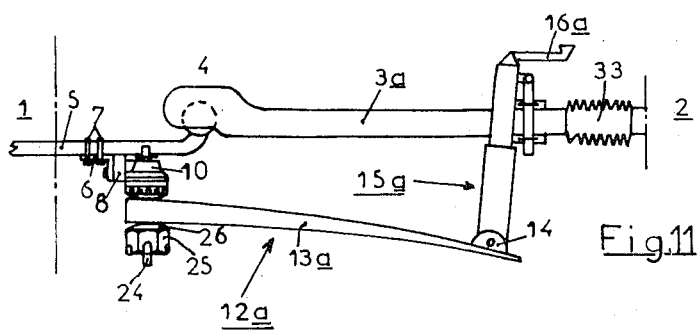

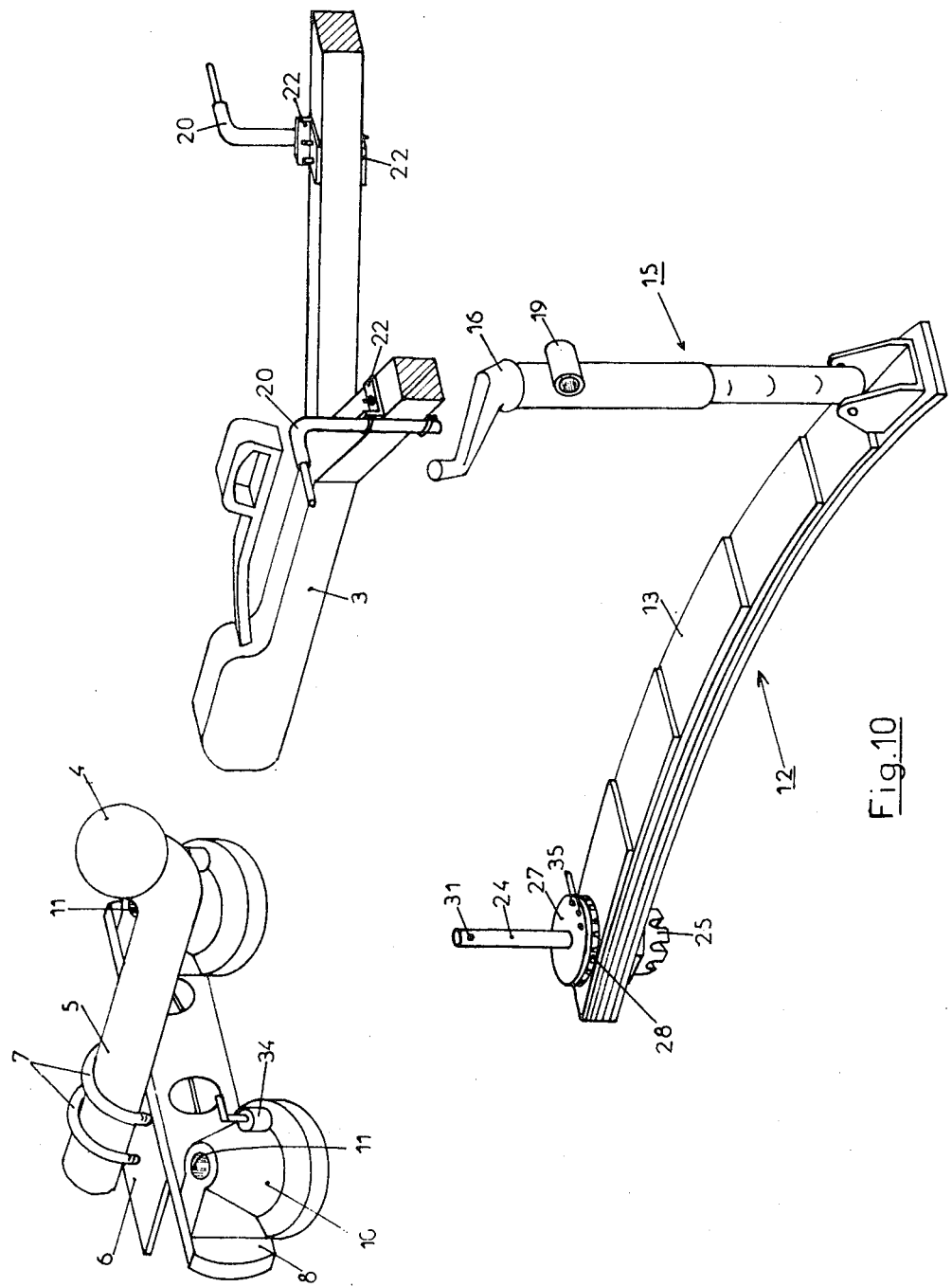

STABILIZING AND ANTI-ZIGZAG DEVICE FOR CARAVANS AND TRAILERS

The invention relates to an anti-zigzag device for attaching caravans or road trailers, in particular as regards tourism.

Anti-zigzag devices are known, which tend to combine a rational distribution of the weights and a damping or braking of the zigzag swaying. Such a device is described in particular in the French patent No. 1,570,587 granted to the Applicant. It uses at least one leaf spring, the rear end of which is acted upon to make it taut and transfer thus some weight to the front wheels of the hauling vehicle, this being done by means of a screw jack, while the front portion of said spring carries a rotary friction damper which brakes the side swaying of the device and prevents the caravan or trailer from being imparted a zigzag motion tending to increase.

In use, it is found that the spring shifts sometimes to a transverse position, whereby the braking action exerted by the friction lining is unsettled. The latter, besides, wears irregularly as a result of such transverse stresses.

The object of the invention is to avoid such drawbacks by providing an anti-zigzag device for attaching caravans or road trailers which ensure at all times the transmission of the vertical stress of the spring to obtain a rational distribution of the weights, and an uniform braking or damping of the swaying by the friction lining, while taking up the transverse stress of the spring and the wear of said lining. Moreover, the device according to the invention constitutes a self-contained unit which is readily positioned and removed and takes up very little space.

An anti-zigzag device for attaching caravans or road trailers according to the invention is characterized in that it includes at least one metallic connection piece, to the rear end of which the lower end of a jack is linked, the other end of said jack being removably coupled to the pole of the caravan, while a linking pin passes through the front portion of said connection piece, said pin being integral with an upper plate above which it projects, and being provided with a lower locking nut to compress the stack constituted by the above-mentioned piece and a rotary friction damper mounted on the pin between the plate and the nut, the projecting upper end of said pin being adapted to be removably fitted into a coupling device integral with the rear of the hauling vehicle.

According to a further feature, the rotary friction damper is constituted by a base sliding along the pin, said base being topped by a friction lining and resting on a first conical spring washer disposed at the top of a ring or sleeve which passes through the connection piece, the latter resting in turn on a second conical spring washer which bears on the nut, all said members being disposed on the linking pin between the plate and the locking nut, the latter allowing adjustably compressing the friction damper.

According to a further feature, each spring washer, when at rest, has a funnel-shaped profile, the top of each washer having the smaller diameter bearing on the corresponding end of the sleeve, whereas the flared top bears on the locking nut and the sliding base respectively, the metallic connection piece being thus located around the sleeve and taking no part in the transmission of the compressive stress of the stack, so that, even if the connection piece tends to come and lie obliquely with respect to the pin, the plate and the base remain parallel to each other on either side of the friction lining, which wears evenly.

According to a further feature, continuously tightening spring washers are used, which maintain a constant compressive stress on the friction lining, even after the latter is widely worn.

According to a further feature, the metallic connection piece is a leaf spring, while the jack is a screw jack.

According to another feature, the metallic connection piece is a rigid bar, and the jack is a screw jack connected to said bar by an adjustable compression spring.

According to a further feature, the coupling device integral with the rear of the tractor vehicle is constituted by a small bar carrying at least one stationary bearing having a vertical bore to receive the projecting end of the linking pin, the top of said pin projecting, when assembled, beyond said bearing to receive removable fixing means, which enables a user to remove the device without unsettling the adjustment of the tightening of the anti-zigzag brake.

According to a further feature, the jack is removably connected to the pole of the caravan through a cranked shaft, one end of which is removably connected to the jack body and the other end of which is secured to the pole without any drilling.

According to another feature, the stationary bearing receiving the projecting end of the linking pin is provided with a movable spring-loaded dog, and the plate integral with said pin is drilled with at least one hole, whereby the anti-zigzag device can be correctly positioned whatever may be the initial position of the caravan or trailer with respect to the hauling vehicle.

According to a first modification of the invention, the central bore in the bearing is flared towards the port through which the free end of the pin is inserted at the time of the coupling operation, while means are provided automatically to prevent the pin from rotating owing merely to the fact that it is mounted in the bearing.

In all cases the pin is, at least when rotating, integral with a plate tightened onto the friction lining of the coupling device. Said plate may be rigidly and finally integral with the pin; in contradistinction, it may slide along said pin in axial direction according to a limited amplitude. In this latter case, the connection between the plate and the pin during the rotation may be provided by flutes, or else by a diametral cotter-pin on the plate, which cotter-pin slides in axial direction through an elongated slot in the pin.

The means for preventing the pin and the plate from rotating in the bearing may be constituted:

either by the plane faces of a frustum of pyramid produced as a single piece both with the plate and the pin, said faces being received inside the corresponding faces of a female frustum of pyramid defined inside the housing of the bearing, or by radial teeth distributed around the pin on the annular face of the plate, which teeth engage with corresponding teeth provided oppositely on the bearing surface of the bearing around the flared end of the port thereof.

According to a preferred embodiment of the invention, the inner bore in the bearing includes at its end of smaller diameter a cylindrical port of short length, while it flares along the most part of its length according to a frusto-conical profile up to the opposite end where it ends in a second concentric frusto-conical housing of larger diameter, inside which the male frusto-conical peripheral face of the lining-carrying plate is adapted to be centred, the teeth preventing the rotation being radially cut in the bearing on the annular transverse face which ensures the transition between the first and second frusto-conical housings.

According to a second modification of the invention, the spring members (leaf spring or helical spring) are mounted above the pole of the caravan, so that the coupling pin fits vertically and in a downward direction inside the stationary rear bearing on the vehicle, whereas, when the spring members are mounted above the pole, the fitting is done in an upward direction. In all cases, tightening means are provided, which are adapted to pull the pin lengthwise inside the bearing, so as to lock efficiently the means preventing the plate from rotating.

These axial tightening means may be constituted:

either by a rotary transverse key provided with a cam, and engaged through a transverse port in the pin end projecting from the stationary bearing, in which case it is only necessary to rotate said cam to make the cam to draw the pin axially in the bearing and ensure the locking thereof, or a lateral claw linked to the stationary bearing, said claw being provided at one end with a handle controlling the rocking, and at the opposite end with a nose adapted to fit into a lateral notch on the plate to pull the latter in axial direction when the claw is rocked, while, after said tightening operation, a transverse cotter-pin is engaged in a diametral hole provided at the pin end projecting from the bearing.

According to an additional modification, the plate may be divided in two superposed coaxial parts, it wit:

a friction plate rigidly integral with the pin and receiving the friction from the anti-zigzag brake lining, a plate carrying the teeth preventing the rotation inside the bearing, which plate is integral with the pin during the rotation while being adapted to slide on said pin.

In this latter case, elastic means are inserted between said plate and said friction plate, said means being preferably frusto-conical washers of the so-called "Belleville" type.

Such a resilient mounting facilitates tightening and locking the pin in the stationary bearing; it prevents in particular any untimely unlocking of the system in operation.

According to a further feature of the invention, the device includes at least one leaf spring, the rear end of which is linked to the lower end of a substantially vertical link, the upper end of the latter being in turn linked to a fork integral with the auxiliary or "Jockey" wheel of the caravan or trailer. Thus, when the Jockey wheel is lowered in a known way by operating a vertical screw jack, the load transferring spring is automatically loosened, which makes it possible to uncouple the trailer. On the contrary, after coupling, it is only necessary to lift the Jockey wheel in the usual way to make the load transferring leaf spring taut.

According to a further possible modification, the device according to the invention includes a rigid stamped sheet iron arm, the rear end of which is flexibly connected through a cable to the lower portion of a slider adapted to be brought nearer to the pole of the trailer by means of a screw jack compressing a helical spring coaxial to said slider, while the front end of said arm is provided with ratchet means which enable it, at the time of the coupling, to fit to the corresponding friction lining plate of the anti-zigzag device. In this latter case, the vertical pin and all the members of the anti-zigzag frictional device remain permanently on the stationary bearing integral with the rear of the vehicle: the stamped sheet iron arm alone is removed by a mere pulling action at the time the trailer is uncoupled, said arm remaining hanging from said trailer.

According to a last modification, the device according to the present invention is intended to be fitted in particular on the poles of tourism trailers provided with safety inertia brakes. It is known that, in this latter case, the pole is provided with a stationary cylindrical rear portion which is integral with the trailer; a longitudinal front arm slides within said cylindrical portion, the front end of said arm being fitted with the coupling device. The relative sliding of the arm and the cylinder against resilient means causes the inertia brake to be released, the latter acting automatically on the wheels of the trailer when the hauling vehicle brakes.

It is known that some known arrangements introduce a transverse reaction on the area where the arm slides and is guided within its cylinder. Such transverse reaction causes an undesired jamming effect, and it is found that it affects adversely the efficient operation of the inertia brake.

The device according to this latter modification has a structure which makes it possible to arrange it so as to remove said drawback.

To this end, a device according to the invention, provided with a substantially horizontal member constituted by a rigid arm or a leaf spring extending under the sliding area for the members controlling the inertia brake of the caravan, is characterized in that it includes elastic return means compressed between the horizontal member (rigid arm or leaf spring) of the load transfer system and one of the two sliding members of the inertia control (front arm or cylinder of the pole).

Such an arrangement makes it possible to introduce in the sliding area a transverse reaction equal and opposed to that resulting from the actuation of the load transfer system.

The appended drawing, given by way of non-limiting example, will allow a better understanding of the features of the invention.

FIG. 1 is a side of a tourism car and a tourism caravan fitted with a double device according to the invention;

FIG. 2 is a top plan view of the car and caravan illustrated in FIG. 1;

FIG. 3 is a plan view corresponding to FIG. 1, and showing on a greater scale the double device positioned on the pole of the caravan;

FIG. 4 is an elevational view of the assembly shown in FIG. 3;

FIG. 5 is a broken perspective view showing on a large scale a device according to the invention, the coupling arrangement to the rear of a hauling vehicle, and the fixing arrangement to the pole of a caravan drawn by said vehicle;

FIG. 6 is a cross-sectional view of the front end of the device according to the invention and the pivot pin and rotary friction damper assembly carried by said front end;

FIG. 7 is a cross-sectional view of the rear end of the device according to the invention, as seen at the level of the axis of the corresponding jack in the case of a device with a leaf spring;

FIG. 8 is a perspective view of the rigid metallic bar substituted for the leaf spring in a modified embodiment of the device according to the invention;

FIG. 9 is a cross-sectional view of the rear end of the bar illustrated in FIG. 8, as seen at the level of the axis of the corresponding jack;

FIG. 10 is a perspective view showing the coupling arrangement positioned at the rear of the tractor vehicle for attaching the pivot pin of the anti-zigzag device, and the way the jack is fixed to the rear end of the latter;

FIG. 11 is an elevational view of the device according to the invention according to the modified embodiment thereof wherein the leaf spring is replaced by a rigid bar, the device being mounted, on the one hand, on a ball carried by the hauling vehicle, and, on the other hand, on the telescopic pole of a caravan;

FIG. 12 is a perspective view of the device illustrated in FIG. 11, made integral with the telescopic pole of a caravan on the manufacture of said pole;

Figure 13:
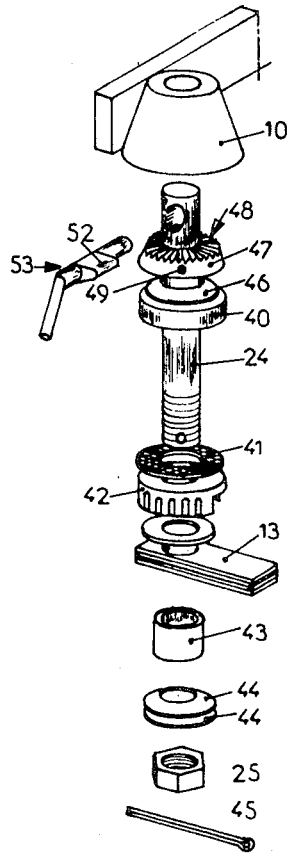
FIG. 13 is a broken view of the members of a coupling device according to a first modification.

FIGS. 1 and 2 of the drawing show a tourism car 1 which draws a caravan 2. The caravan 2 includes in a known way a pole 3 linked to a ball 4. The latter is mounted according to standards which are being normalized, but are still different in every country. For instance, said ball 4 is fixed to the rear of the car 1 by its rod 5, or else by a known coupling device especially designed so as to distribute the loads. Such a device is described, in particular, in the French Patent No. 1,379,102 granted to the Applicant. The rod 5 carries an attachment device for at least one anti-zigzag device 12 according to the invention. Said attachment device is constituted by a plate 6 having a reversed L-profile and secured by straps 7 on the rod 5 of the ball 4. The portion of said plate 6 normal to the rod 5 is provided with holes allowing bolting on said portion a small bar 8 provided with corresponding bores and, in addition, with bores 9. Said bores 9 make it possible to bolt or weld to the small bar 8 at least one stationary bearing 10, which has for instance a generally conical shape and has a thoroughfare bore 11 drilled therein.

In the example illustrated in FIGS. 1-5 and 10-11, there is shown a double anti-zigzag system including two devices 12 according to the invention, which are mounted on either side of the pole 3. Said two devices are symmetrical, and only one will be described (FIGS. 5 and 10 show, besides, only one device, for the sake of clarity). On the other hand, it would be possible to mount only one such device on the side of the pole 3: the selection depends on the results required from the car 1 and on the characteristics of said car 1 and the caravan 2.

Each device 12 includes a leaf spring 13, the rear end of which, that is, the thinner one, is provided with a strap 14. The base of a screw jack 15 is linked to said strap, the extension or retraction of said jack being obtained by manually acting on a handle 16. The latter is integral with a threaded rod 17 which rotates within a nut 18 integral with the base of the jack 15 (FIG. 7). The movable portion of the jack 15 carries near its top a tubular sleeve 19 which is normal to the vertical axis of the jack 15. Said sleeve 19 is intended for receiving the end of reduced diameter of a cranked rod 20, the other end of which is adapted to be fixed to the pole 3 of the caravan 2 by two stirrups 21 bolted on two L-irons 22 mounted without drilling, the one on the upper face, and the other one on the lower face of the pole 3, these two L-irons being united to each other by bolting (FIG. 5).

The front of the stack of leaves of the spring 13 is passed through by a ring 23, the length of which is equal to the thickness of the stack of leaves of the spring 13 at that location. A vertical pin 24 passes through said ring 23. The threaded lower end of said pin projects from under the spring 13, and is provided with a castellated adjusting nut 25, while a conical spring washer 26 is interposed between said nut 25 and the lower surface of the spring 13, against the bottom of the ring 23. The pin 24 carries at its upper portion a circular plate 27 forged in one piece therewith, and, before entering the ring 23, passes through a sliding circular base 28, which carries a brake lining disc 29. A conical spring washer 30 is interposed between the underface of the base 28 and the upper surface of the spring 13, said washer being disposed in a direction opposed to that of the washer 26. The lining 29 is thus clamped between its base 28 and the plate 27 integral with the pin 24, and the compression of the assembly is adjustable by means of the castellated nut 25. An anti-friction washer having, for instance, a self-lubricating coating is disposed under the castellated nut 25. Under such conditions, it will be seen that the spring 13 may rotate about the pin 24, said rotation being braked by the friction damper constituted by the members 27, 28, 29. The pin 24 is provided at its top with a bore 31 intended to receive a cotter-pin 32, as will be explained below. The base 28 is preferably provided with vanes, and made of aluminium so as to facilitate the dissipation of heat.

In a modified embodiment 12a of the device according to the invention, as shown in FIGS. 8, 9, 11, 12, the leaf spring 13 is replaced by a rigid steel bar 13a having generally the same profile as a leaf spring 12. The rear end, that is, the thinner end of said bar 13a is also provided with a strap 14 to which the base of a jack 15a is linked. Said jack includes an operating handle 16a which is integral with a threaded rod 17a, the latter rotating inside a nut 18a integral with the base of the jack 15a. Said base encloses, besides, a helical compression spring 32, the height of which is thus adjustable by operating the handle 16a. The jack 15a ensures thus the elastic suspension of the rigid bar 13a. The latter is provided at its front end with a link and rotary friction damper system identical with that just described as regards the leaf spring 13, said system being mounted exactly in the same way on the bar 13a.

The jack 15a is likewise provided at its upper portion with a tubular sleeve 19 which allows, through a cranked rod 20, straps 21, and L-irons 22, mounting said jack on the pole of a caravan, exactly as described hereinabove with reference to the jack 15 on the leaf spring 13.

Using a rigid bar 13a in combination with the screw and spring jack 15a makes it possible to obtain the same results as with a leaf spring 13 and a jack 15 as far as the elasticity of the suspension and the distribution of the weights are concerned, while reducing the cost price and the weight of the anti-zigzag device.

A movable spring-loaded dog 34 may be provided on the stationary bearing 10, while several holes 35 are provided in the plate 27 integral with the pin 24. In this way, even if the caravan is not in line with the hauling vehicle at the time of the assembling, the device 12 or 12a will be correctly positioned as soon as the vehicle runs, as the slightest rotation of the pin 24 causes the dog 34 to fall into one of the holes 35.

As shown in FIG. 11, when the pole is a telescopic pole, the device according to the invention may be mounted forward of the junction of the sliding members of the pole, which junction is indicated by the sleeve 33.

A telescopic pole manufactured directly with a device according to the invention, as well as with the coupling head, could be used, said device being disposed along the same axis as the coupling head (FIG. 12).

The operation is as follows:

To position a device 12 or 12a according to the invention, after coupling the pole 3 to the ball 4 in a known way it is only necessary to insert the upper end of the pin 24 into the stationary bearing 10 until said upper end projects from the bore 11 provided in said bearing. The cotter-pin 32 is then inserted into the hole 31 in said pin 24, so as to make the latter fast inside the stationary bearing 10. At that time the rear of the spring 13 or the bar 13a is near the ground. The jack 15 or 15a is extended to a maximum by means of the handle 16 or 16a till the tubular sleeve 19 of the jack is brought opposite the upper end of the cranked rod 20. Said end, the diameter of which is reduced, is inserted into the sleeve 19, and locked at the outlet of the cranked rod 20 by means of a split pin 36, the height of which is calculated so as to prevent also the handle 16 from rotating, when necessary. By acting then in the opposite direction on the handle 16 or 16a of the jack 15 or 15a, the screw 17 is screwed in the nut 18, or the screw 17a is screwed in the nut 18a, which contracts the jack and raises the strap 14. The leaf spring 13, or else the spring 32 in the jack 15a, is thus compressed till the desired effort is obtained, which tends to transfer some weight onto the front axle of the car 1.

On the other hand, by means of the castellated nut 25, the compression of the lining 29 is adjusted at will, to adjust the damping force or lateral braking, on the one hand, and to take up the possible wear of the lining, on the other hand. Then, when the car is running, each spring 13 or bar 13a pivots about the pin 24 in the turnings, according to a motion dampened by the rotary friction damper 27, 28, 29. Resonant swaying is thus prevented from appearing.

The dismounting is very easy. It is only necessary to remove the pins 32 and 36 to free the whole anti-zigzag and load distributing device.

Figure 15:
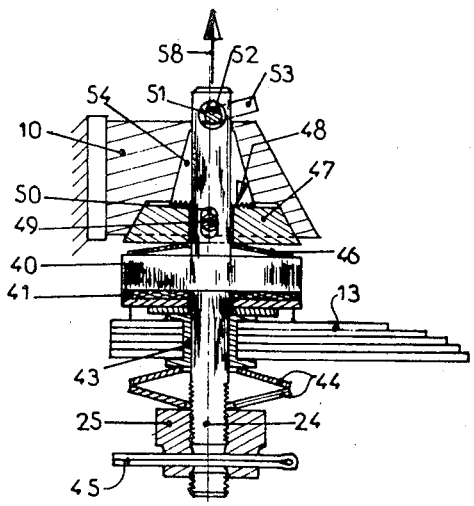
FIG. 15 is an axial sectional view of the device of FIG. 13 after the mounting thereof.
Figure 14:
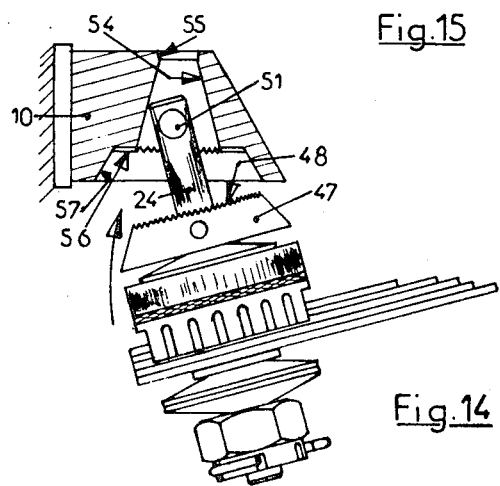
FIG. 14 illustrates the operation for mounting said coupling device.

FIGS. 13 to 15 illustrate a first modification, which includes a pin 24 integral with a transverse annular plate 40. Said base bears upon a friction lining 41 which bears in turn on the plane upper surface of a base 42. Said surface comes to top one end of the leaf spring 13. The leaves of said spring are stacked about a seized cylindrical sleeve 43 which holds them rigidly in a finally assembled condition. Moreover, said sleeve 43 is preferably expanded exactly to the diameter of the corresponding cylindrical portion of the pin 24, so as to ensure the fitting of the leaf spring on said pin. However, the spring 13 and its sleeve 43 can rotate freely around the pin 24.

Conical spring washers 44 are disposed under the leaves of the spring, and then a nut 25 is screwed on the threaded lower end of the pin 24. A split pin 45 holds said nut 25 in position.

The spring washers 44 ensure the clamping of the friction lining 41 between the plate 40 and the base 42.

At least one spring washer 46 and then a plate 47, the peripheral surface of which is frusto-conical, are disposed on the upper surface of the plate 40. On the other hand, the upper annular surface of the plate 47 is provided with radial teeth 48. A diametral cotter-pin 49 secured to the plate 47 passes through an elongated opening 50 in the pin 24. The plate 47 is thus adapted to slide downwards along the pin 24, but is rotatingly integral with the latter.

The pin 24 is provided at its upper part with a diametral bore 51, inside which the cam 52 of a key 53 can be fitted.

The stationary bearing 10 is provided with an inner frusto-conical recess 54 which flares downwardly. Said recess 54 ends at its top in a short cylindrical portion 55.

The flared lower end of the frusto-conical recess 54 is still widened by a transverse annular shoulder in which radial teeth 56 are cut, said teeth being adapted to receive the teeth 48 of the plate 47. Lastly, below the teeth 56, the stationary bearing 10 has a flared frusto-conical inlet 57 intended to receive and centre the plate 47.

The mounting is carried out as follows:

When a user wants to couple his trailer, he brings the pin 24 upwardly under the stationary bearing 10. Owing to the fact that generally the pole of the trailer is not exactly aligned with the general direction of the hauling car, the user is led to present the pin 24 slantwise, as shown in FIG. 14. This way of insertion is made possible by reason of the flared frusto-conical shape of the recess 54.

As soon as the upper end of the pin 24 projects above the stationary bearing 10, the user inserts the key 53 into the hole 51, and then acts on the handle of said key to rotate the cam 52, so that the latter draws the pin 24 upwards (FIG. 15, arrow 58) before ensuring the locking thereof in the correct position. During this locking step, the teeth 48 of the plate 47 come to mesh with the teeth 56 of the stationary bearing 10. From now on, the plate 47 is prevented to drive, as well as, consequently, the pin 24 and the plate 40. The uncoupling operation is carried out by operating conversely.

The spring washer 46 facilitates locking the pin 24 by means of the key 52. In certain cases, however, said washer 46 may be omitted, while the plates 40 and 47 are made in one piece, as shown in FIGS. 16, 17, and 18.

Figure 16:
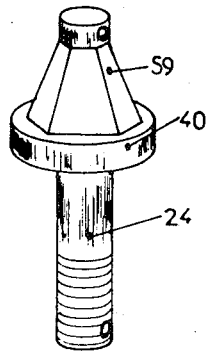
FIGS. 16, 17, 18 illustrate two possible modifications for preventing the pin from rotating.

In the example shown in FIG. 16, the plate 40 is integral with a frustum of pyramid, the plane faces of which are received in a corresponding pyramidal recess provided inside the stationary bearing 10.

Figure 17:
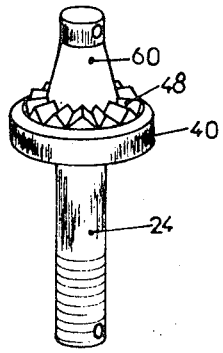

In the example shown in FIG. 17, radial teeth 48 of the above-mentioned type are provided directly on the upper annular surface of the plate 40, and surmounted by a frustum of cone 60, the latter being integral with the pin 24.

Figure 18:
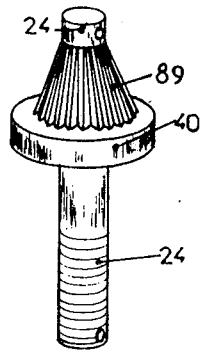

In the example shown in FIG. 18, a frustum of cone 89 is provided between the plate 40 and the cylindrical top of the pin 24, said frustum of cone being provided with longitudinal flutes adapted to fit into corresponding flutes cut in the inner wall of the female cone 54 in the stationary bearing 10.

Figure 19:
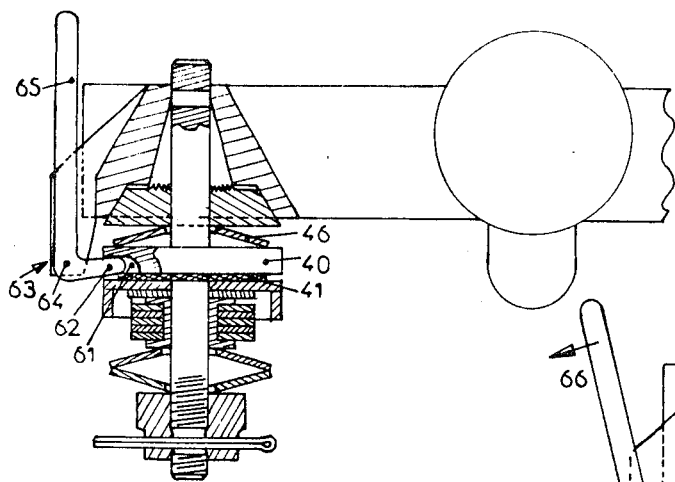
FIGS. 19 and 20 are sectional views illustrating two steps of the mounting of another modification.
Figure 20:
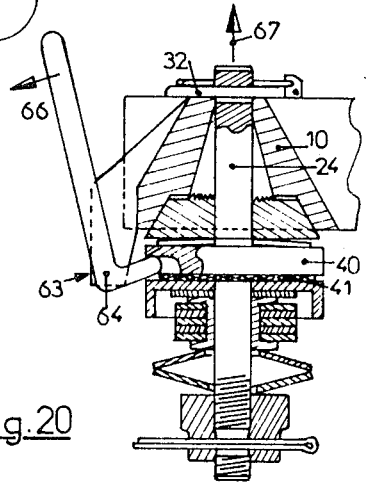

FIGS. 19 and 20 illustrate another modified embodiment for mounting and locking the pin 24 inside the stationary bearing 10. To this end, at least one notch 61 is provided on the side of the plate 40, said notch being adapted to receive the nose of a claw 63. The latter is pivoted on a fixed pivot 64 on the bearing 10, and is provided with an operating handle 65 intended to be actuated in the direction of the arrow 66 so as to lift the pin assembly 24. Together with the lifting of the pin 24, there is a compression of the spring washer 46. At the end of the lifting motion, the upper end of the pin 24 projects from the top of the bearing 10, and it is only necessary to position a cotter-pin 32 to fasten the coupling.

Figure 21:
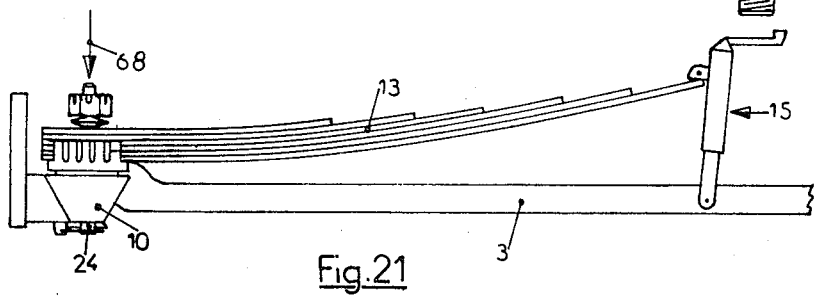
FIG. 21 shows a modification wherein the coupling operation is carried out in a downward direction.

Obviously, the modified embodiments just described can be used in a converse disposition, that is, with the leaf spring 13 disposed above the coupling pole 3 (FIG. 21), in which case the pin 24 is inserted in the stationary bearing 10 according to a downward vertical motion as indicated by the arrow 68.

When the pole 3 is fitted with an inertia brake, it includes:

at the rear a cylinder 69 integral with the chassis of the trailer;

at the front, an arm 70 adapted to slide within the cylinder 69 according to the longitudinal direction of the arrow 71.

Figure 22:
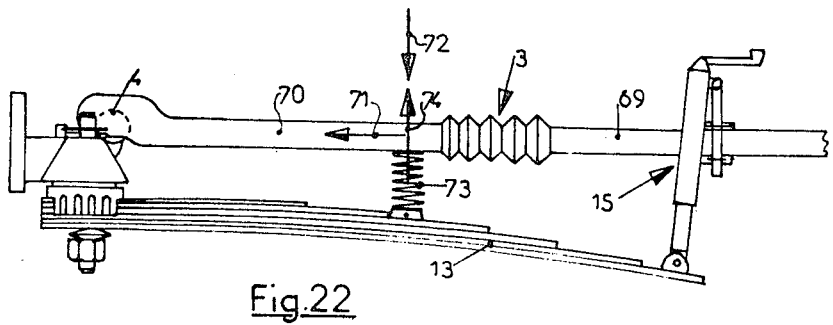
FIG. 22 shows the device as provided with a compensating arrangement for facilitating the inertia braking.

As the coupling ball 4 is fixed to the front end of the arm 70 while the jack 15 for tautening the spring 13 bears on the cylinder 69 (FIG. 22), it is clear that the tautening of the load transferring spring 13 brings about on the pole 3 a downward transverse reaction 72 which might cause jamming phenomena between the two sliding parts 69 and 70. To obviate such drawback, the invention provides the interposition of a vertically disposed compression spring 73 between the leaf spring 13 and the sliding area for the inertia brake on the pole 3. Said spring 73 exerts an upward vertical force 74 which opposes the undesired reaction 72, the effect of the latter being thus cancelled.

Figure 23:
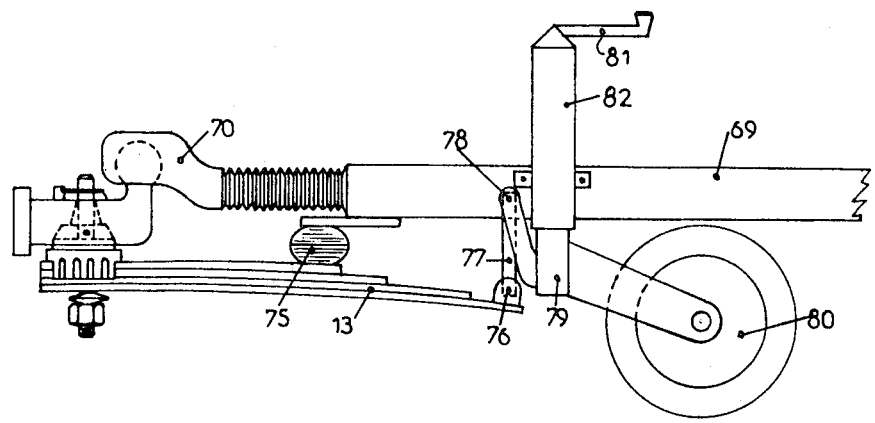
FIG. 23 illustrates a modification wherein the tensioning of the spring is associated to the control mechanism for the Jockey wheel.

In the modification illustrated in FIG. 23, the metallic spring 73 is replaced by a pneumatic member 75 which contains a pressurized gas cushion.

Moreover, the rear end of the leaf spring 13 is linked through a pin 76 to a connecting-rod 77, the upper end of which is in turn linked through a pin 78 to the fork 79 of the Jockey wheel 80 of the trailer. Thus, by operating the handle 81 of the jack 82 which controls the raising or the lowering of the Jockey wheel 80, the leaf spring 13 is automatically tautened or released.

Figure 24:
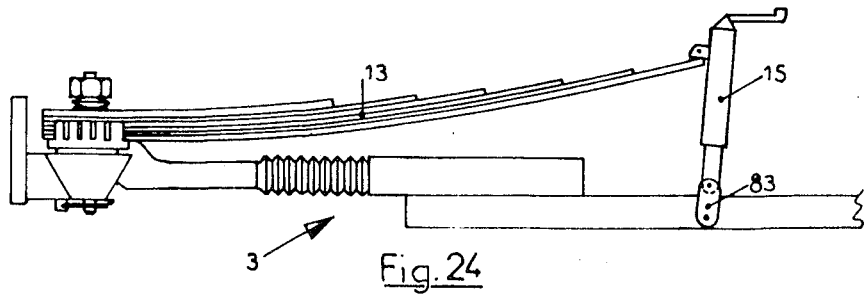
FIGS. 24 and 25 illustrate two further possible modified embodiments.

The modification illustrated in FIG. 24 relates to a trailer pole 3 having a broken transverse profile, in which case the jack 15 intended to tauten the leaf spring 13 is linked to said pole 3 through a link 83.

Figure 25:
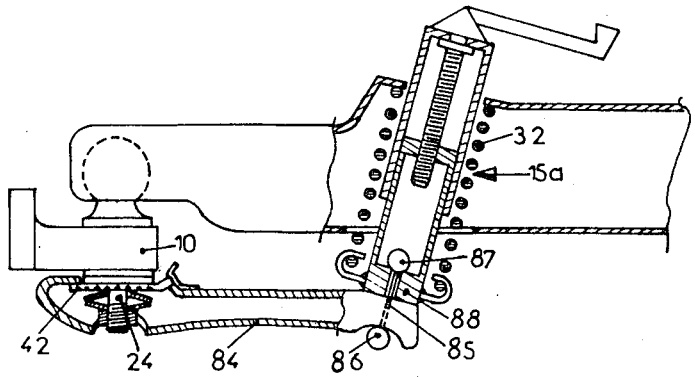

FIG. 25 illustrates a modified embodiment wherein the assembly of pin 24 and base 42 remains permanently mounted in the stationary bearing 10. On the other hand, a rigid arm 84 of stamped sheet iron can ratch and lock itself on said base 42. The rigid arm 84 operates in a way similar to the rigid arm 13a.

The rear end of the arm 84 is connected through a flexible cable 85 to the movable lower end 88 of the tightening jack 15a, said cable having plumbed ends 86 and 87. Said jack 15a ensures, in the same way as in the embodiments shown in FIGS. 9 and 11 the operation of the load transferring spring 32.

The advantages of the device according to the invention are as follows:

it is adapted to be fitted to any coupling ball and any trailer pole, very quickly and without any drilling operation;

it allows adjusting the lifting effort for the distribution of weights accurately, by means of the spring 13 or the bar 13a, the characteristics being calculated so as to allow a maximum raising of the hauling vehicle without the upward effort exceeding the downward effort set by the regulations for each type of coupling, while the jack 15 or 15a is also of assistance;

it allows also adjusting the damping or braking effort accurately, thanks to the use of conical spring washers 26 and 30 which cooperate with the castellated nut 25 to ensure the calibration of said effort, and prevent the "across" stresses of the leaf spring 13 or the bar 13a from reacting on the lining 29;

said conical spring washers allow maintaining a continuous tightening of said braking lining, even if the latter has a substantial wear, up to 10%, that is, the washers deliver the same effort if the lining has lost 10% of its thickness;

the ring or sleeve 23 between the conical spring washers 26 and 30 ensures a perfect axial bearing on the braking disc in spite of the "across" stresses of the leaf spring 13 or the bar 13a;

the device is adapted to be removed without unsettling the braking adjustment; it takes up little space, and can be easily stored in a car trunk;

It remains efficient for preventing the swaying, even if there is no weight on the trailer pole, that is, if the leaf spring 13 is not tautened, or else, in the case where a bar 13a is used, if the spring 32 in the jack 15a is not compressed;

it constitutes, besides, a removable suspension reinforcing arrangement for the hauling vehicle.

I claim:

1. A stabilizing and anti-zigzag device for attaching caravans or road trailers, characterized in that it includes at least one metallic connection piece, to the rear end of which an end of a jack is linked, the other end of said jack being removably coupled to the pole of the caravan, while a linking pin passes through the front portion of said connection piece, said pin being integral with an upper plate above which it projects, and being provided with a lower locking nut to compress the stack constituted by the above-mentioned piece and a rotary friction damper constituted by a base sliding along the pin, said base being topped by a friction lining and resting on a first conical spring washer mounted on said pin between the plate and the nut, the projecting upper end of the pin being adapted to be removably fitted into a coupling device integral with the rear of the hauling vehicle.

2. A device according to claim 1, characterized in that the rotary friction damper and first conical spring washer are disposed at the top of a ring or sleeve which passes through the connection piece, the latter resting in turn on a second conical spring washer which bears on the nut, all said members being slipped on the linking pin between the plate and the locking nut, the latter allowing adjustably compressing the friction damper.

3. A device according to claim 2, characterized in that each spring washer, when at rest, has a funnel-shaped profile, the top of smaller diameter of each washer bearing on the corresponding end of the sleeve, whereas the flared top bears on the locking nut and the sliding base respectively, the metallic connection piece being thus located around the sleeve and taking no part in the transmission of the compressive stress of the stack, so that, even if the connection piece tends to come and lie obliquely with respect to the pin, the plate and the base remain parallel to each other on either side of the friction lining, the latter wearing thus evenly.

4. A device according to claim 3, characterized in that it uses continuously tightening spring washers, which maintain a constant compressive stress on the friction lining, even after the latter is heavily worn.

5. A device according claim 1, characterized in that the metallic connection piece is a leaf spring, while the jack is a screw jack.

6. A device according to claim 1, characterized in that the metallic connection piece is a rigid bar, while the jack is a screw jack connected to said bar through an adjustable compression spring.

7. A device according to claim 1, characterized in that the coupling device integral with the rear of the hauling vehicle is constituted by a small bar carrying at least one stationary bearing having a vertical bore to receive the projecting and of the linking pin, which end, after the assembling, projects from said fixed bearing to receive removable fixing means, which enables a user to remove the device without unsetting the adjustment of the tightening of the anit-zigzag brake.

8. A device according to claim 1, characterized in that the jack is removably connected to the pole of the caravan through a cranked rod, one end of which is removably connected to the jack body, and the other end of which is secured to the pole without any drilling operation.

9. A device according to claim 7, characterized in that the stationary bearing receiving the projecting end of the linking pin is provided with a spring-loaded movable dog, and the plate integral with said pin is drilled with at least one hole, whereby the anti-zigzag device can be correctly positioned, whatever may be the initial position of the caravan or trailer with respect to the hauling vehicle.

10. A stabilizing and anti-zigzag device according to claim 7, characterized in that the central bore in the bearing is flared over more than half its length towards the port through which the free end of the linking pin is introduced at the time of the coupling operation, while means are provided to prevent automatically said pin from rotating owing merely to the fact that it is mounted in the bearing.

11. A stabilizing and anti-zigzag device according to claim 10, characterized in that the linking pin is only rotatingly integral with the plate clamped on the friction lining of the coupling.

12. A stabilizing and anti-zigzag device according to claim 11, characterized in that the plate is adapted to slide in axial direction along the linking pin according to a limited amplitude, while said plate and said pin may be rotatingly connected by flutes, or else by a diametral cotter-pin on the plate, said cotter-pin sliding in axial direction through an elongated slot in said pin.

13. A stabilizing and anti-zigzag device according to claim 10, characterized in that the means rotatingly immobilizing the linking pin and the plate in the bearing are constituted by the plane faces of a frustum of pyramid produced as a single piece both with the plate and the linking pin, said faces being received inside the corresponding faces of a female frustum of pyramid defined inside the recess in the bearing.

14. A stabilizing and anti-zigzag device according to claim 10, characterized in that the means rotatingly immobilizing the linking pin and the plate in the bearing are constituted by radial teeth distributed around the linking pin on the annular surface of the plate, which teeth engage with corresponding teeth provided oppositely along a circle on the bearing surface of the bearing, around the flared end of the port thereof.

15. A stabilizing and anti-zigzag device according to claim 10, characterized in that the inner recess in the bearing is provided at its end of smaller diameter with a cylindrical port of short length, while it flares along the most part of its length according to a frusto-conical profile up to the opposite end where it ends in a second concentrical frusto-conical recess of larger diameter, inside which the male frusto-conical peripheral surface of the lining-carrying plate is adapted to be centred, the teeth preventing the rotation being radially cut in the bearing on the annular transverse face which ensures the transition between the first and the second frusto-conical recesses.

16. A stabilizing and anti-zigzag device according to claim 10, characterized in that it includes tightening means adapted to pull the linking pin lengthwise inside the bearing, and to lock efficiently the means preventing the plate from rotating, said tightening means being constituted by a rotary transverse key provided with a cam, which is engaged through a transverse port in the pin and projecting from the stationary bearing, it being only necessary to rotate said key to make the cam draw the linking pin axially inside the bearing and ensure the locking of said pin.

17. A stabilizing and anti-zigzag device according to claim 10, characterized in that it includes tightening means adapted to pull the linking pin lengthwise inside the bearing, so as to lock efficiently the means preventing the plate from rotating, said axial tightening means comprising a lateral claw linked to the stationary bearing and provided at one end with a rocking control handle, and at the opposite end with a nose adapted to fit in a lateral notch on the plate to draw the latter in axial direction when the claw is caused to rock, while, after said tightening operation a transverse cotter-pin is introduced in a diametral hole provided in the pin end projecting from the bearing.

18. A stabilizing and anti-zigzag device according to claim 1, characterized in that its plate is divided into two superposed coaxial parts, to wit:
   a friction plate rigidly integral with the linking pin and receiving the friction of the anti-zigzag brake lining;
   a plate carrying the teeth preventing the rotation inside the bearing, said plate being rotatingly integral with the linking pin, while being adapted to slide thereon.

19. A stabilizing and anti-zigzag device according to claim 18, characterized in that resilient means constituted by frusto-conical washers of the so-called "Belleville" type are interposed between the teeth-carrying plate and the friction plate.

20. A stabilizing and anti-zigzag device according to claim 1, characterized in that it includes at least one leaf spring, the rear end of which is linked to the lower end of a substantially vertical link, the upper end of the latter being in turn liked to a fork integral with the auxiliary wheel, or "Jockey wheel" of the trailer or caravan, so that, when the Jockey is lowered in a known way by the operation of a vertical screw jack, the load transferring spring is automatically loosened, which makes it possible to uncouple the trailer, whereas, on the contrary, after the coupling operation, it is only necessary to lift the Jockey wheel in the usual way to make automatically the load transferring leaf spring taut.

21. A stabilizing and anti-zigzag device according to claim 1, characterized in that it includes a rigid arm of stamped sheet iron, the rear end of which is flexibly connected through a cable to the lower end of a slider adapted to be brought nearer to the pole of the trailer or caravan by means of a screw jack compressing a helical spring coaxial thereto, while the front end of said arm is provided with ratchet means which enable it, at the time of the coupling operation, to fit to the corresponding friction lining plate of the anti-zigzag devices, so that the vertical linking pin and all the members of the frictional anti-zigzag device remain permanently on the stationary bearing which is integral with the rear of the hauling vehicle, the stamped sheet iron arm alone being removed by a mere pulling action at the time the trailer is uncoupled, said arm remaining then hanging from said trailer.

22. A stabilizing and anti-zigzag device according to claim 1, characterized in that the spring means (leaf spring or helical spring) are mounted above the pole of the trailer so that the linking pin of the device is introduced downwards in a vertical direction into the rear stationary bearing on the hauling vehicle.

* * * * *